United States Patent
[15] 3,700,997

Smith
[45] Oct. 24, 1972

[54] RAPID CHARGING OF BATTERIES

[72] Inventor: Stephen Hagar Smith, Manhattan Beach, Calif.

[73] Assignee: McCulloch Corporation, Los Angeles, Calif.

[22] Filed: Feb. 24, 1971

[21] Appl. No.: 118,420

[52] U.S. Cl. ..................320/20, 320/14, 320/21, 320/43
[51] Int. Cl. ..................H01m 33/00, H02j 7/10
[58] Field of Search.........320/14, 31, 32, 39, 40, 37, 320/20, 21

[56] References Cited

UNITED STATES PATENTS

| 3,424,969 | 1/1969 | Barry | 320/21 |
| 3,487,284 | 12/1969 | Cady | 320/21 X |
| 3,517,293 | 6/1970 | Burkett et al. | 320/39 X |
| 3,535,608 | 10/1970 | Cramer et al. | 320/40 X |
| 3,559,025 | 1/1971 | Burkett et al. | 320/14 |
| 3,576,487 | 4/1971 | Chase | 320/21 X |

Primary Examiner—J. D. Miller
Assistant Examiner—Robert J. Hickey
Attorney—Christie, Parker & Hale

[57] ABSTRACT

The high rate changing of a battery is terminated by monitoring the battery voltage during a fixed interval of time in which high rate charge current is removed. If the battery voltage decreases to a predetermined value in the fixed interval of time, then high rate charge current is again applied for a second fixed interval of time. The steps are repeated until the battery voltage with high rate charge current removed does not decrease to the predetermined value within the fixed interval of time.

15 Claims, 4 Drawing Figures

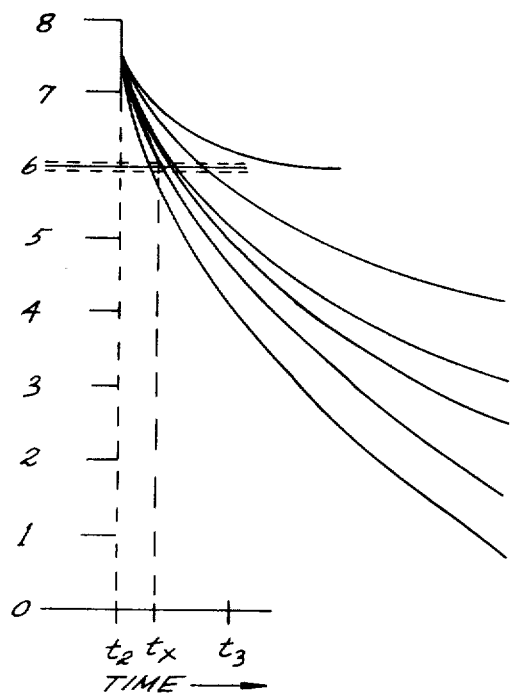
FIG_2
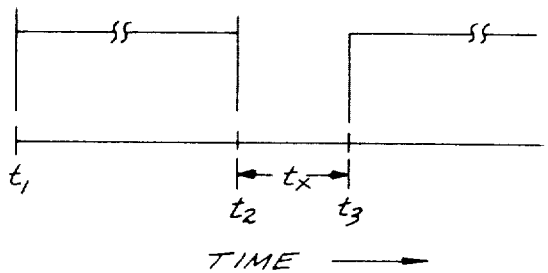
FIG_3
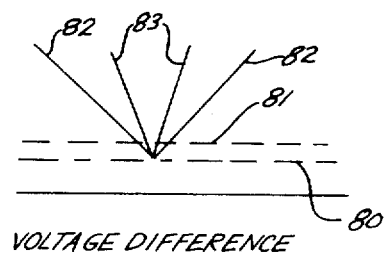
FIG_4

3,700,997

RAPID CHARGING OF BATTERIES

CROSS REFERENCES TO RELATED APPLICATIONS

The invention herein is related to those disclosed and claimed in U.S. Pat. No. 3,517,293 and in the copending U.S. applications Ser. No. 867,835 filed Oct. 20, 1969, now U.S. Pat. No. 3,614,583 Ser. No. 870,402 filed Oct. 20, 1969, now U.S. Pat. No. 3,609,503 and Ser. No. 844,469 filed July 24, 1969 now U.S. Pat. No. 3,609,502 and assigned to the same assignee as this application.

BACKGROUND OF THE INVENTION

Field of the Invention

This invention relates to a method and apparatus for terminating the high rate charge of a battery and, more particularly, to the sensing of quiescent battery voltage for terminating the high rate charge of a battery. It is known that the quiescent voltage of a battery upon the interruption of the application of high rate charging current to the battery may be an excellent indicator of the state of the charge of the battery. This is particularly true when the battery is being charged by the basic method and apparatus of rapid charging a battery disclosed and claimed in U.S. Pat. No, 3,517,293. As the battery becomes charged, the battery terminal voltage decreases at a slower rate each time the high rate charge current is interrupted. It is the purpose of this invention to accurately monitor the quiescent voltage of the battery for terminating the high rate charge of the battery.

SUMMARY OF THE INVENTION

In accordance with the present invention, the high rate charging of batteries comprised of one or more cells is terminated by sensing the quiescent voltage of the battery and comparing this quiescent voltage with a reference voltage for controlling a controllable switch through which the high rate charge current is applied to the battery. The method of terminating comprises the steps of applying a high rate charge current for a first predetermined fixed interval of time, interrupting the high rate charge current and monitoring the battery voltage while the high rate charge current is removed, reapplying the high rate charge current if the battery voltage decreases at least to a predetermined voltage within a second fixed interval of time, repeating these steps until the battery voltage, while the high rate charge current is interrupted, does not decrease to the predetermined voltage during the second fixed interval of time, and thereafter inhibiting the further application of the high rate charge current. However, the battery may be further charged by providing a path for trickle charge current to the battery upon the interruption of high rate charge current and upon the inhibiting of the further application of high rate charge current.

BRIEF DESCRIPTION OF THE DRAWINGS

The above and other features and advantages of the present invention may be understood more clearly and fully upon consideration of the following specification and drawings in which:

FIG. 2 is a chart representing the battery terminal voltage characteristics upon the interruption of high rate charge in accordance with the present invention;

FIG. 3 is a chart depicting the fixed intervals of time during which high rate charge current is applied to the battery and the quiescent battery voltage is sensed in accordance with the present invention; and FIG. 4 is a chart depicting the transfer characteristics of a differential amplifier useful in the circuit of FIG. 1.

DESCRIPTION OF THE PREFERRED EMBODIMENTS

Figure 1:
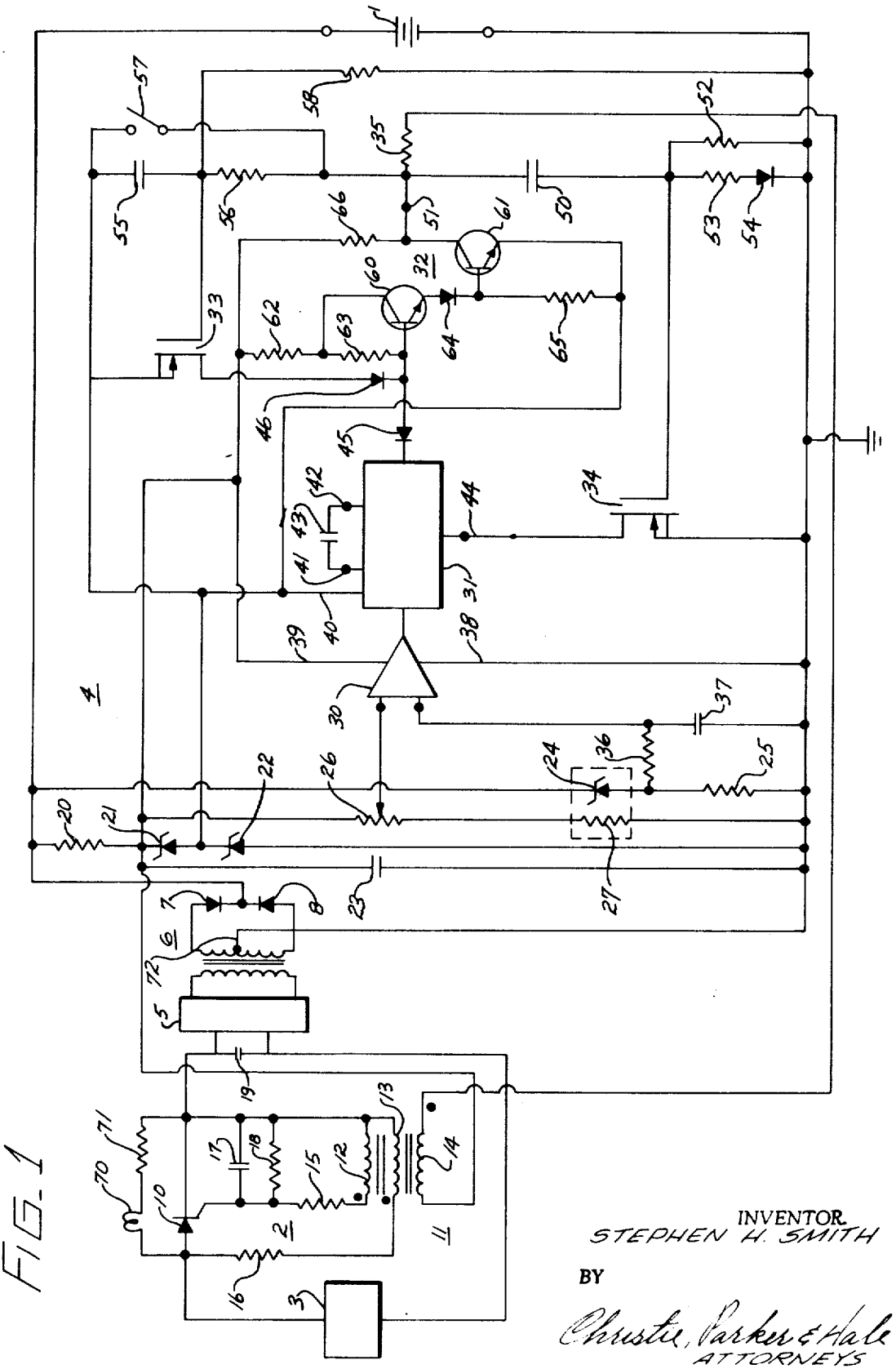
FIG. 1 is a combined block and schematic diagram of a battery charger incorporating the method of the present invention.

In the method of terminating the high rate charging of batteries in accordance with the present invention, high rate charge current pulses are applied to a battery 1 through a controllable switch 2 connected between a source 3 of charge current pulses and the battery 1. A control circuit 4 is connected across the battery to monitor the quiescent voltage of the battery 1 and to control the operation of the switch 2. In certain applications where it is desired to provide a relatively lightweight charger, the circuitry might further include an inverter 5 and a transformer 6 for converting the output of the source 3 to a high frequency alternating-current source as disclosed and claimed in the copending application Ser. No. 844,469, filed July 24, 1969. In any event, the control circuit 4 controls the controllable switch 2 so that high rate charge current is applied to the battery 1 for a first fixed interval of time and is then interrupted for the monitoring of the quiescent battery voltage. Quiescent battery voltage is the voltage across the terminals of the battery during the time when no charge current is flowing. It should be noted that trickle charge current may be applied to the battery which may have a value of approximately 1/100th of the high rate charge current so that the battery voltage during the application of such trickle charge may also be considered to be the quiescent voltage. Therefore when the quiescent voltage is monitored or sensed in this application, it may be either the battery terminal voltage while trickle charge current is being applied to the battery or the battery terminal voltage when no charge current is flowing.

The control circuit 4 compares the battery quiescent voltage to a reference voltage. This comparison takes place during a second fixed interval of time. If the battery quiescent voltage decreases to a predetermined value, which predetermined value is with respect to the reference voltage, then the control circuit 4 causes the controllable switch 2 to again apply the high rate charge current. The steps are repeated until the battery quiescent voltage remains above the predetermined value while it is being monitored during the interruption of the high rate charge current during the second fixed interval of time. If the quiescent battery voltage does not decrease to the predetermined value during this second fixed interval of time, the control circuit 4 inhibits the further operation of the controllable switch 2 so that no further high rate charge current may be applied to the battery.

The controllable switch 2 in the circuit of FIG. 1 comprises a silicon-controlled rectifier 10 having its anode connected to on side of the source 3 and its cathode connected to the other side of source 3 through the inverter 5. The controllable switch 2 further includes a saturable transformer 11 having three windings: a gate winding 12, a series winding 13, and a control winding 14. The gate winding 12 is connected between the gate and cathode of the silicon-controlled rectifier 10 through a current limiting resistor 15. The series winding 13 is connected between the anode and cathode of the silicon-controlled rectifier 10 through a current limiting resistor 16. The control winding 14 is connected to the control circuit 4 in a manner hereinafter to be described. A capacitor 17 and a resistor 18 are each connected between the gate and the cathode of the silicon-controlled rectifier 10.

The control circuit 4 comprises a first voltage divider circuit connected across the battery including a resistor 20, a Zener diode 21, and a Zener diode 22 connected in series. A capacitor 23 is connected across the series connected Zener diodes 21 and 22. The control circuit 4 further includes a second voltage divider circuit connected across the battery 1, which voltage divider circuit includes a Zener diode 24 connected in series with a resistor 25. Connected across the series connected Zener diodes 21 and 22 is another voltage divider circuit comprising potentiometer 26 in series with a thermistor 27. A first reference potential appears at the junction between resistor 20 and Zener diode 21 and a second reference potential of lower value appears between Zener diodes 21 and 22. These reference potentials are employed to supply the operating voltage for the remainder of the control circuit 4. Zener diode 24 is in thermal contact with thermistor 27 to provide temperature compensation for the diode 24.

The remainder of the control circuit 4 comprises a differential amplifier and bipolar detector 30, a threshold adjusting circuit 31, a transistor switching circuit 32, a field effect transistor 33 and a field effect transistor 34 and their control circuits, and a current limiting resistor 35 connected between the output of the transistor switching circuit 32 and the control winding 14 of saturable transformer 11. The two inputs to the differential amplifier and bipolar detector 30 are a reference voltage at the slider arm of potentiometer 26 and a voltage at the junction of Zener diode 24 and resistor 25, which is representative of the battery terminal voltage. The voltage between Zener diode 24 and resistor 25 is applied to the one input of differential amplifier and bipolar detector 30 through a high frequency filter network comprised of a resistor 36 connected between the junction of Zener diode 24 and resistor 25 and the one input terminal of differential amplifier and bipolar detector 30. The filter also includes a capacitor 37 connected between the one input terminal of differential amplifier and bipolar detector 30 and ground reference, which is also connected to the negative terminal of the battery 1. The differential amplifier and bipolar detector 30 includes a terminal 38 connected to ground reference and a terminal 39 connected to the source voltage at the top of Zener diode 21. The output of the differential amplifier and bipolar detector 30 is connected to the input of the threshold adjusting circuit 31, which has one terminal 40 connected to the lower voltage source between Zener diodes 21 and 22. The threshold adjusting circuit 31 additionally has a pair of external terminals 41 and 42 across which a capacitor 43 is connected. The threshold adjusting circuit 31 further includes a threshold adjusting terminal 44 to which the drain element of field effect transistor 34 is connected. The output of the threshold adjusting circuit 31 is connected to the transistor switching circuit 32 through a diode 45. The junction between the diode 45 and the transistor switching circuit 32 is connected to the second source voltage between Zener diodes 21 and 22 through a diode 46 and field effect transistor 33. The drain element of field effect transistor 33 is connected to the cathode of diode 46. The differential amplifier and bipolar detector 30, threshold adjusting circuit 31, transistor switching circuit 32, and diodes 45 and 46 may advantageously be an integrated circuit such as the integrated circuit MC1540 manufactured by Motorola Corporation.

The control circuit of field effect transistor 34 includes a capacitor 50 connected between its gate and the output terminal 51 of the transistor switching circuit 32. The circuit of field effect transistor 34 further includes a resistor 52 connected between its gate and source elements and the series connection of a resistor 53 and a diode 54 connected across resistor 52.

The control circuit of field effect transistor 33 includes a capacitor 55 connected between its gate and source elements and a resistor 56 connected between its gate and the output terminal 51 of the transistor switching circuit 32. A normally open switch 57 is connected across the series combination of capacitor 55 and resistor 56. An additional resistor 58 is connected between the gate of field effect transistor 33 and ground reference.

The transistor switching circuit 32 includes a pair of transistors 60 and 61 with transistor 60 providing the bias current for transistor 61. Both transistors 60 and 61 are NPN transistors. The collector of transistor 60 is connected to the first voltage source at the top of Zener diode 21 through a resistor 62. A resistor 63 is connected between the collector and base of transistor 60 and a diode 64 in series with a resistor 65 is connected between the emitter of transistor 60 and the source voltage between Zener diodes 21 and 22. The base of transistor 61 is connected to the junction of diode 64 and resistor 65 and the emitter of transistor 61 is connected to the voltage source between Zener diodes 21 and 22. The collector of transistor 61 is connected through a resistor 66 to the source voltage at the top of Zener diode 21. The output terminal 51 of the transistor switching circuit 32 is connected to the collector of transistor 61.

In operation, direct-current pulses are supplied by source 3, which may include a full wave rectifier rectifying the commercial 60 cycle, 110 volt source. As the voltage from source 3 goes positive, current flows through resistor 16 and series winding 13 of saturable transformer 11. This current quickly saturates saturable transformer 11 so that the gate to cathode voltage required to turn on SCR 10 will not be developed across gate winding 12. Thus the only path for current from source 3 to inverter 5 will be through series resistor 16 and series winding 13.

An additional path may be provided and is shown in FIG. 1. This is a trickle charge current path around silicon-controlled rectifier 10 and includes an indicator lamp 70 in series with a current-limiting resistor 71.

The inverter 5 converts the direct-current pulses to a high frequency alternating-current voltage. If the inverter 5 is of the type disclosed and claimed in copending application Ser. No. 844,469, the alternating-current voltage will have an essentially square wave form. This alternating-current voltage is coupled through the transformer 6 to the diodes 7 and 8 connected in a full wave rectifying configuration so that direct current pulses appear between the junction of the diodes 7 and 8 and the center tap 72 of the secondary of transformer 6. Thus when the battery 1 is first coupled to the charger and the direct-current charging pulses are applied from source 3, a trickle charge current flows into the battery 1. This current may be at the C/10 rate, which is generally recommended by the battery manufacturers for the charging of batteries such as nickel cadmium batteries.

It is assumed for purposes of illustration that the battery 1 is a 24 volt nickel cadmium battery comprised of 20 nickel cadmium cells, and has a 7 ampere hour rating. It is disclosed in U.S. Pat. No. 3,517,293 that such a battery may be rapidly charged by applying a high rate charge current, which is generally a charge current in excess of the C rate or nominal 1 hour rate of the cells of the battery, and intermittently discharging the battery as charge progresses. The battery may be intermittently discharged in response to a condition of the battery as disclosed and claimed in U.S. Pat. No. 3,517,293, or it may be intermittently discharged at the end of each high rate charge current pulse as disclosed and claimed in the copending application Ser. No. 844,469. The invention in this application is disclosed in the context of the rapid charging method disclosed and claimed in this copending application. Thus at the end of each high rate charging current pulse, a discharge path exists through either rectifying diode 7 or 8 and the secondary of transformer 6 to the center tap 72 thereof and back to the negative terminal of the battery 1.

When charging a 24 volt battery with high rate charge current, the output voltage at the junction of diodes 7 and 8 will reach a peak value of approximately 31 volts. With 31 volts applied across the voltage divider comprised of resistor 20, Zener diode 21, and Zener diode 22, 12 volts will appear at the top of Zener diode 21 and 6 volts will appear at the junction of Zener diodes 21 and 22, all with respect to ground reference to which the negative terminal of the battery 1 is connected.

To provide the high rate charge current, the silicon-controlled rectifier 10 must be triggered on to present a low impedance path between the source 3 and the inverter 5. The operation of the silicon-controlled rectifier 10 is controlled by the windings of the saturable transformer 11, resistors 15 and 16, and the delay circuit of capacitor 17 and resistor 18. When current flows only in series winding 13, the silicon-controlled rectifier 10 may not be turned on because this current quickly saturates the transformer. To turn on the silicon-controlled rectifier 10, current must flow in the control winding 14. This current must flow out of the end of control winding 14 having the dot to turn on the silicon-controlled rectifier as follows.

When current is flowing in control winding 14 and out of the end of the winding having the dot, the magnetic field generated by this current opposes the magnetic field generated by the current flowing in series winding 13. Thus, assuming current is flowing in control winding 14, the current in series winding 13 will buck the field produced by the current in control winding 14; and as the current in series winding 13 increases, it will cause the magnetic field to move out of saturation and decrease in value. As the magnetic field begins to collapse in the core of the saturable transformer 11, a voltage will be induced in gate winding 12 which will trigger on silicon-controlled rectifier 10. This action will continue and high rate charge current will be applied until the current in control winding 14 ceases to flow. The current in control winding 14 is controlled by the operation of the control circuit 4.

Initially no current is flowing in control winding 14 and trickle charge current is being applied to the battery 1. To begin the high rate charge operation, switch 57 is momentarily closed to apply 6 volts at the output terminal 51 of control circuit 4. With the application of 6 volts at terminal 51, capacitor 50, which has a 12 volt charge across it, will cause a negative 6 volts to appear between the gate and source elements of field effect transistor 34. This negative 6 volts will cause the field effect transistor 34 to turn off and remove ground from terminal 44 of the threshold adjusting circuit 31. Additionally, the plus 6 volts appearing at output terminal 51 will appear at one end of control winding 14 while plus 12 volts appears at the other end of control winding 14, which is connected to the top of Zener diode 21. With the application of the 6 volts to the one end of control winding 14, current will flow in control winding 14 to initiate the high rate charge of the battery. Before the application of the 6 volts to output terminal 51 through the closing of switch 57, 12 volts appears at this output through resistor 66 of the transistor switching circuit 32. Upon the removal of ground from terminal 44 of the threshold adjusting circuit 31, transistors 60 and 61 are turned on so that plus 6 volts remains at the output terminal 51 through the saturated transistor 61. The plus 6 volts will remain at output terminal 51 for a first fixed interval of time determined by the discharge time of capacitor 50. Capacitor 50 will discharge through the low resistance path of saturated transistor 61, Zener diode 22, and the high resistance of resistor 52. The values of resistor 52 and capacitor 50 are selected to establish the fixed interval of time during which high rate charge current is applied to the battery 1. For purposes of illustration it is assumed that the RC time constant is such that the field effect transistor 34 will be held off for approximately 10 seconds. When field effect transistor 34 again turns on and applies ground reference at terminal 44, transistors 60 and 61 of transistor switching circuit 32 will be turned off and plus 12 volts will again appear at terminal 51, thereby terminating the application of the high rate charge current to the battery 1. Transistors 60 and 61 will remain off until a sufficiently high voltage is applied to the base of transistor 60. Assuming the emitter of transistor 61 is held at 6 volts, then a plus voltage of approximately 7 ½ volts must appear at the base of transistor 60 to turn these transistors on.

Field effect transistor 33 operates to hold the base of transistor 60 at less than 6 volts when it is turned on. Field effect transistor 33 is held off for a second selected fixed interval of time after each interruption of high rate charge current. During the application of high rate charge current, output terminal 51 is held at plus 6 volts so that capacitor 55 charges to approximately 3.6 volts. With the resistors 56 and 58 respectively having the values of 15 megohms and 10 megohms and with 3.6 volts across capacitor 55, the field effect transistor 33 is held off. Upon the removal of the plus 6 volts from output terminal 51 and the appearance of plus 12 volts thereat, capacitor 55 will discharge, and after a selected interval of time, such as 400 milliseconds, the gate of field effect transistor 33 will be biased to turn on the field effect transistor 33 to hold transistors 60 and 61 off. When transistors 60 and 61 are held off, no further current may flow through control winding 14 so that no more high rate charge current may be applied to the battery 1. When this happens the high rate charge and, in certain applications, the rapid charging of the battery 1 is terminated by inhibiting controllable switch 2.

To terminate the high rate charge at the proper time, the quiescent voltage of the battery, that is the voltage while high rate charge current is not flowing, is monitored. Assuming Zener diode 24 is a 24 volt Zener, then the balance of the battery terminal voltage will appear across resistor 25. This voltage is compared to the reference voltage at the slider arm of potentiometer 26 within the differential amplifier and bipolar detector 30. When the field effect transistor 34 turns on and applies ground reference to terminal 44 of the threshold adjusting circuit 31, it turns off transistors 60 and 61 to terminate the high rate charge and sets the threshold level of the differential amplifier and bipolar detector 30 at a selected threshold value such as 17 millivolts. If 17 millivolts is selected as the threshold, then the portion of the quiescent battery voltage that appears across resistor 25 must decrease to within 17 millivolts of the reference voltage applied to the differential amplifier and bipolar detector 30 and below the reference voltage before a signal is coupled through diode 45 to turn transistors 60 and 61 back on.

The battery terminal voltage upon the removal of high rate charge current has the wave form shown in FIG. 2. Assuming the peak value of the voltage applied to the battery 1 is 32 volts and that 24 volts is dropped across Zener diode 24, then 8 volts will appear across resistor 25. This 8 volts will rapidly drop due to the IR losses in the battery 1 to some value such as 7 volts as shown in FIG. 2. Thereafter the battery quiescent voltage will slowly drift down to a stabilized voltage which may not be reached for several hours. However, the rate of decrease of the battery voltage is an excellent indicator of the state of charge of the battery. As the state of charge of the battery increases, the rate of decrease of the quiescent battery voltage diminishes. Thus the bottom curve of FIG. 2 represents a battery having a lower level of charge than does the upper curves of FIG. 2. Assuming the value of capacitor 55 and the resistors in its discharge path are selected so that field effect transistor 33 remains off for 400 milliseconds, then if the battery voltage decreases so that the portion across resistor 25 passes through the 17 millivolt window about the 6 volt reference at the input to differential amplifier and bipolar detector 30, a pulse will be transmitted through diode 45 to turn on transistors 60 and 61 to reapply the high rate charge current. If the portion of the battery voltage across resistor 25 does not decrease to the point where it passes through the 17 millivolt window about the 6 volt reference in 400 milliseconds, this time being representatively shown as time $t_3$ in FIG. 2, the field effect transistor 33 will turn on to inhibit the further application of high rate charge current to the battery 1. The reference voltage to which the battery voltage is compared at the inputs to the differential amplifier and bipolar detector 30 is selected to provide a desired level of charge in the battery being charged before the termination of the high rate charging of the battery.

During the initial application of high rate charging current to a discharged battery, the quiescent battery voltage will very rapidly drift down to and pass through the 17 millivolt window about the reference voltage so that high rate charging current will remain off only a short period of time, substantially less than the selected 400 milliseconds. This is represented by the time $t_x$ shown on FIG. 2, which time $t_x$ will move between time $t_1$, representing interruption of high rate charge current, toward time $t_3$, which represents the selected interval of time of 400 milliseconds. As the time $t_x$ moves toward the time $t_3$, the state of charge of the battery 1 is increasing.

The first fixed interval of time during which high rate charging current is applied to the battery as determined by the resistance and capacitance values in the discharge path of capacitor 50 is representatively shown on FIG. 3 as the time between $t_1$ and $t_2$. The second selected interval of time during which the quiescent battery voltage is sensed and at the end of which the high rate charging will be terminated if the quiescent battery voltage remains above a predetermined value is represented by the time between $t_2$ and $t_3$ on FIG. 3.

The transfer characteristic of the differential amplifier and bipolar detector 30 and threshold adjusting circuit 31 is representatively shown in FIG. 4. Dotted line 80 represents the reference voltage applied to one input of the differential amplifier and bipolar detector 30 and dotted line 81 represents the window through which the output of the differential amplifier and bipolar detector 30 must pass to have any control over transistors 60 and 61 in the control circuit 4. Solid curves 82 and 83 are representative of the input signal applied to the variable input terminal of the differential amplifier and bipolar detector 30 while monitoring the quiescent voltage of the battery 1 being charged. Curve 82 represents a slow rate of decrease of battery terminal voltage and thus represents a higher level of charge in the battery than does the curve 83. The base of chart of FIG. 4 is voltage difference at the inputs to the differential amplifier and bipolar detector 30 and the base of the charts in FIGS. 2 and 3 is time.

The fixed interval of time during which high rate charge current is applied to the battery may be lengthened or shortened by adjusting the time constant of the capacitor 50, resistor 52 combination. Additionally, the maximum length of time that the battery quiescent voltage is sensed may also be increased or decreased by adjusting the time constant of the capacitor 55, resistors 56 and 58. Furthermore, the quiescent voltage at which high rate charge is terminated may be varied by changing the value of the reference voltage at the one input to the differential amplifier and bipolar detector 30.

The controllable switch 2 includes the capacitor 17 and resistor 18 to protect any rectifying elements that may be used in the source 3 and other elements in source 3 from surge or in-rush currents. If filter capacitors are connected across the input of inverter 5, as shown schematically by capacitor 19 in FIG. 1 and as shown in the above mentioned application Ser. No, 844,469, any rectifying elements and possibly other elements in source 3 may be damaged if the alternating-current is applied to source 3 near its peak value while the filter capacitor 19 is uncharged. To prevent the silicon-controlled rectifier from immediately turning on upon the application of voltage from source 3, capacitor 17 provides a time delay to place control in the series winding 13 and control winding 14 of saturable transformer 11.

Various changes may be made in the details of construction without departing from the spirit and scope of the invention as defined by the appended claims.

What is claimed is:

1. A method of charging a battery comprising the steps of applying a high rate charge current for a first fixed interval of time; interrupting high rate charging; monitoring battery voltage with high rate charge current removed; reapplying high rate charge if the battery voltage decreases at least to a predetermined voltage within a second fixed interval of time; repeating the steps until the battery voltage with high rate charge current removed does not decrease to the predetermined voltage during the second fixed interval of time; and thereafter inhibiting the further application of the high rate charge current.

2. A method of charging a battery comprising the steps of applying high rate charge current pulses with fixed repetition rate discharge pulses between each charge current pulse for a first fixed interval of time, reducing the charge current to a trickle charge rate at the end of each first fixed interval of time, monitoring the difference between the battery voltage during trickle charge and a reference voltage, reapplying high rate charge current each time said difference reduces to zero in less than a second fixed interval of time, and terminating high rate charge if said difference does not reach zero in said second fixed interval of time.

3. A method of charging a battery comprising the steps of applying a charging current in excess of the nominal 1 hour rate of the cells of the battery for a first fixed interval of time; interrupting the charging at a rate in excess of the nominal 1 hour rate; monitoring battery voltage with the charge current in excess of the nominal 1 hour rate removed; reapplying charging current in excess of the nominal 1 hour rate if the battery voltage decreases at least to a predetermined voltage within a second fixed interval of time; repeating the steps until the battery voltage with charge current in excess of the nominal 1 hour rate removed does not decrease to the predetermined voltage during the second fixed interval of time; and thereafter inhibiting the further application of charge current at a rate in excess of the nominal 1 hour rate.

4. An apparatus for charging a battery comprising a source of charging current pulses; a first path between the source and the battery to be charged including a controllable switch having a high impedance state and a low impedance state for applying charge current at a rate in excess of the nominal 1 hour rate of the cells of the battery; a trickle charge current path connected across said controllable switch; and a control circuit including means for monitoring the rate of change of the battery voltage upon removal of the high rate charge current and means responsive to the monitoring means for controlling the operation of the controllable switch by holding said switch in its high impedance state after the rate of change of battery voltage is less than a preselected value.

5. An apparatus for charging a battery comprising a controllable switch having a high impedance state and a low impedance state connected between a source of charge current pulses and the battery to be charged and a control circuit for controlling the operation of the controllable switch; the control circuit including circuit means for placing the controllable switch in its low impedance state to apply a high rate charging current to the battery for a first fixed interval of time, circuit means for interrupting the application of the high rate charge current by changing the controllable switch to its high impedance state, circuit means for comparing the battery terminal voltage to a reference voltage to generate a control signal to place the controllable switch in its low impedance state, and circuit means for rendering the control signal of the comparing circuit means ineffective if the control signal is generated after a second selected interval of time and for maintaining the controllable switch in its high impedance state.

6. An apparatus in accordance with claim 5 wherein the comparing circuit means includes a differential amplifier and bipolar detector.

7. An apparatus in accordance with claim 5 wherein the placing circuit means includes a first field effect transistor and a resistive-capacitive biasing circuit having a preselected time constant for biasing the first field effect transistor in a first state for the first selected interval of time and said rendering and maintaining circuit means includes a second field effect transistor and a resistive-capacitive biasing circuit for maintaining the second field effect transistor in a first state for the second selected interval of time.

8. An apparatus in accordance with claim 5 wherein the controllable switch comprises a silicon-controlled rectifier and a saturable transformer having a control winding, a series winding, and a gate winding, the gate winding being connected between the gate and cathode of said silicon-controlled rectifier, the series winding being connected between the anode and cathode of the silicon-controlled rectifier, and the control winding being connected to the control circuit for control of current flow therethrough.

9. An apparatus in accordance with claim 8 wherein the controllable switch further includes means for preventing surge current through the silicon-controlled rectifier.

10. An apparatus for rapidly charging a battery comprising a source of direct current, and inverter circuit for converting the direct current from the source to high frequency alternating-current; a transformer connected to the output of the inverter; a rectifying circuit connected to the secondary of the transformer for converting the alternating-current voltage from the inverter to direct current charging pulses; said rectifying circuit including a pair of diodes connected to the opposite ends of the secondary of the transformer; a controllable switch having a high impedance state and a low impedance state connected between the inverter and the source of direct current; circuit means connecting the output of the rectifying circuit to the battery to be charged; and control circuit means for controlling the operation of the controllable switch, the control circuit means including circuit means for placing the controllable switch in its low impedance state to apply a high rate charging current to the battery for a first fixed interval of time, circuit means for interrupting the application of the high rate charge current by changing the controllable switch to its high impedance state, circuit means for comparing the battery terminal voltage to a reference voltage to generate a control signal to place the controllable switch in its low impedance state, and circuit means for rendering the control signal of the comparing circuit means ineffective if the control signal is generated after a second selected interval of time and for maintaining the controllable switch in its high impedance state.

11. An apparatus in accordance with claim 10 wherein the comparing circuit means includes a differential amplifier and bipolar detector.

12. An apparatus in accordance with claim 10 wherein the placing circuit means includes a field effect transistor and a resistive-capacitive biasing circuit having a preselected time constant for biasing the field effect transistor in a first state for the first selected interval of time and said rendering and maintaining circuit means includes a field effect transistor and a resistive-capacitive biasing circuit for maintaining the field effect transistor in a first state for the second selected interval of time.

13. An apparatus in accordance with claim 10 wherein the controllable switch comprises a silicon-controlled rectifier and a saturable transformer having a control winding, a series winding, and a gate winding, the gate winding being connected between the gate and cathode of said silicon-controlled rectifier, the series winding being connected between the anode and cathode of the silicon-controlled rectifier, and the control winding being connected to the control circuit for control of current flow therethrough.

14. An apparatus in accordance with claim 13 wherein the controllable switch further includes means for preventing surge current through the silicon-controlled rectifier.

15. A method of charging a battery comprising the steps of applying a high rate charge current for a first fixed interval of time; interrupting high rate charging; monitoring the quiescent battery voltage; reapplying high rate charge current if the quiescent voltage decreases at least to a predetermined voltage within a second fixed interval of time; repeating the steps until the quiescent battery voltage does not decrease to the predetermined voltage during the second fixed interval of time; and thereafter inhibiting the further application of the high rate charge current.

* * * * *